(12) United States Patent
Stone

(10) Patent No.: US 10,319,353 B2
(45) Date of Patent: Jun. 11, 2019

(54) METHOD FOR AUDIO SAMPLE PLAYBACK USING MAPPED IMPULSE RESPONSES

(71) Applicant: The Stone Family Trust of 1992, Oak Park, CA (US)

(72) Inventor: Christopher L. Stone, Oak Park, CA (US)

(73) Assignee: THE STONE FAMILY TRUST OF 1992, Oak Park, CA (US)

( * ) Notice: Subject to any disclaimer, the term of this patent is extended or adjusted under 35 U.S.C. 154(b) by 0 days.

(21) Appl. No.: 15/694,667

(22) Filed: Sep. 1, 2017

(65) Prior Publication Data

US 2018/0061385 A1    Mar. 1, 2018

Related U.S. Application Data

(60) Provisional application No. 62/495,098, filed on Sep. 1, 2016.

(51) Int. Cl.
| | | |
|---|---|---|
| *G10H 1/02* | (2006.01) | |
| *G10H 1/00* | (2006.01) | |
| *G10H 7/10* | (2006.01) | |
| *G10H 3/12* | (2006.01) | |
| *G10H 5/02* | (2006.01) | |
| *G06F 16/61* | (2019.01) | |
| *G10H 1/08* | (2006.01) | |
| *G10L 25/51* | (2013.01) | |
| *G10L 25/93* | (2013.01) | |

(52) U.S. Cl.
CPC .......... *G10H 1/0091* (2013.01); *G06F 16/61* (2019.01); *G10H 1/02* (2013.01); *G10H 1/08* (2013.01); *G10H 3/125* (2013.01); *G10H 5/02* (2013.01); *G10H 7/10* (2013.01); *G10H 2240/145* (2013.01); *G10H 2250/235* (2013.01); *G10L 25/51* (2013.01); *G10L 25/93* (2013.01)

(58) Field of Classification Search
CPC .......... G10H 1/0091; G10H 1/02; G10H 1/08; G10H 3/125; G10H 5/02; G10H 5/06; G10H 7/10; G10H 7/00; G10H 7/12; G10H 7/02; G10H 2240/145; G10H 2250/235; G10H 2250/641; G06F 17/30778; G06F 17/30787
USPC .............................................. 381/118, 98, 61
See application file for complete search history.

(56) References Cited

U.S. PATENT DOCUMENTS

| | | | |
|---|---|---|---|
| 2011/0064233 A1* | 3/2011 | Van Buskirk | G10H 1/0091 381/61 |
| 2013/0019739 A1* | 1/2013 | Vainiala | G10H 1/0091 84/622 |

* cited by examiner

*Primary Examiner* — Ahmad F. Matar
*Assistant Examiner* — Sabrina Diaz
(74) *Attorney, Agent, or Firm* — Womble Bond Dickinson (US) LLP; Joseph Bach, Esq.

(57) ABSTRACT

A sample library for sample notes, wherein each note has been samples at a plurality of dynamic layers, each note having a main sample and a plurality of impulse response samples. Each impulse response sample corresponding to a deconvolution of the main note and one corresponding dynamic layer sample. During playback of a note the main sample is convoluted with a corresponding impulse response sample to produce a simulated target note.

19 Claims, 7 Drawing Sheets

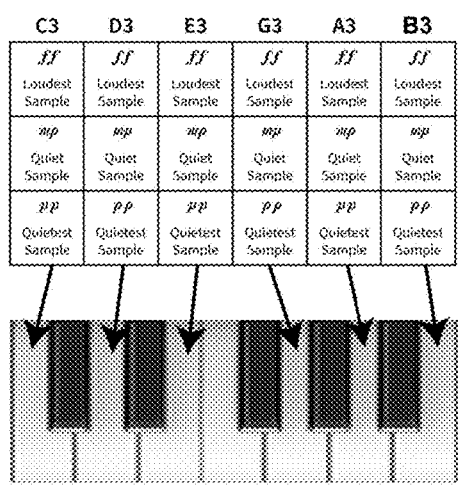 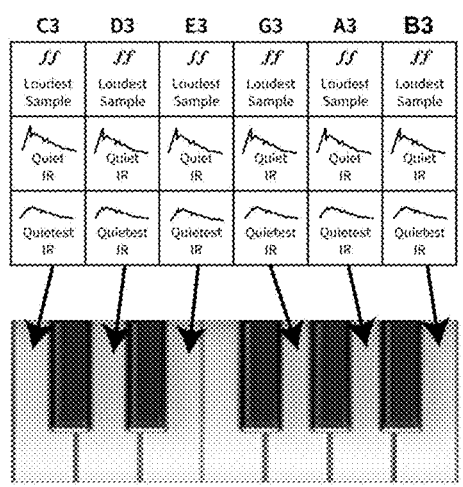
Figure 2A                    Figure 2B

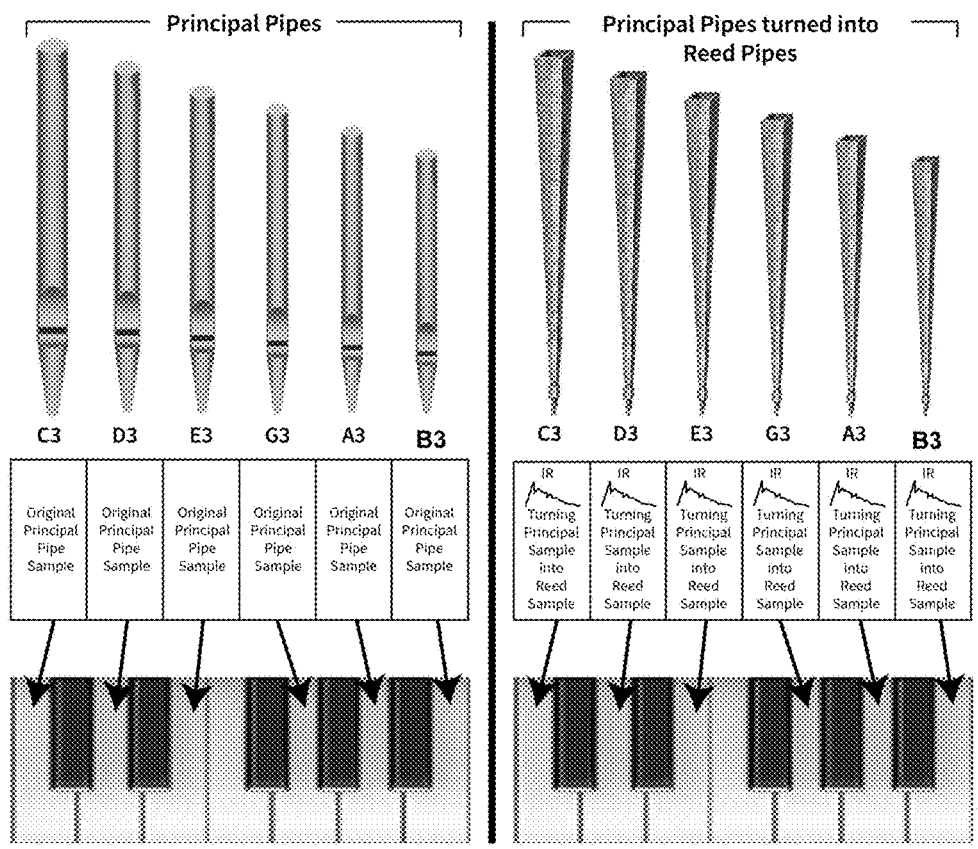
*Figure 3A*      *Figure 3B*

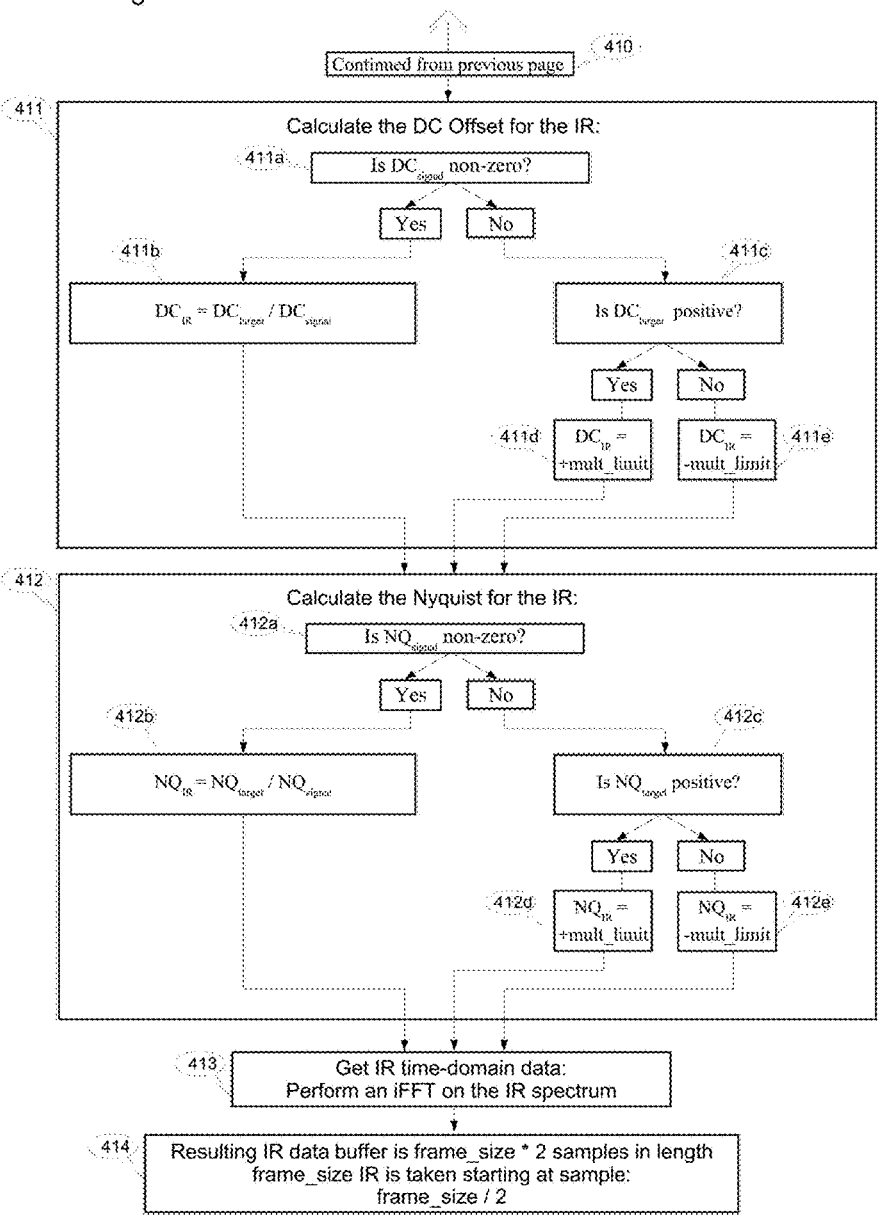

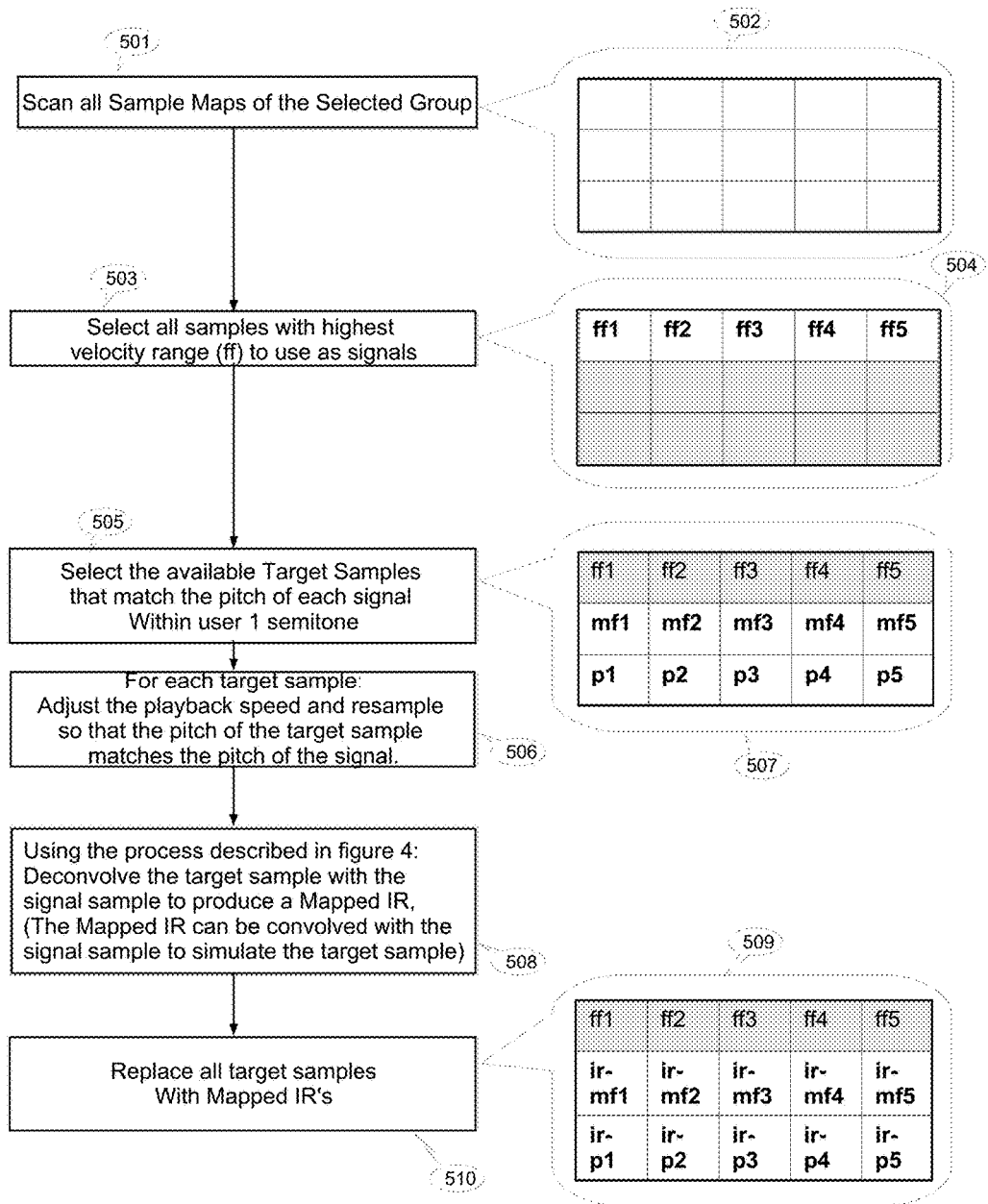

METHOD FOR AUDIO SAMPLE PLAYBACK USING MAPPED IMPULSE RESPONSES

RELATED APPLICATION

This Application claims priority benefit from U.S. Provisional Application Ser. No. 62/495,098, filed on Sep. 1, 2016, the disclosure of which is incorporated herein by reference in its entirety.

BACKGROUND

1. Field

The disclosed invention relates to sound processing and, more specifically, to generating a sample library and recreating musical instruments sounds from the library.

2. Related Art

A sampler is an electronic or digital musical instrument that uses sound recordings (or "samples") of real instrument sounds (e.g., a piano, violin or trumpet). The samples are pre-recorded and stored in an audio sample library. The samples can be played back by means of the sampler program itself, a MIDI keyboard, sequencer or another triggering device (e.g., electronic drums) to perform or compose music. In conventional sample libraries several recordings are made of the same note at different dynamic (volume) levels. These are known as dynamic layers, such as (FF) meaning very loud, (MF or MP) meaning soft and (PP) meaning very soft. Each dynamic layer of an instrument has its own unique sonic characteristic known as a timbral signature. Timbre, also referred to as tone color or tone quality, is the perceived sound quality of a musical note, sound or tone. Musicians can change the timbre of the music they are playing by using different playing techniques. For example, a violinist can use different bowing styles or play on different parts of the string to obtain different timbres (e.g., playing sul tasto produces a light, airy timbre, whereas playing sul ponticello produces a harsh, even an aggressive tone). For this reason, the greater the number of sampled dynamic layers of an instrument, the more sophisticated and realistic it will sound when performed with a MIDI keyboard or similar music control device connected to a sample playback engine containing the samples.

In digital music production, "footprint" refers to the amount of data storage required for the content of an audio sample library. On a computer or digital note player, especially on modern portable devices, there is often a limited amount of storage space for audio data, or footprint. The standard audio industry solution to reducing the number of audio samples is commonly accomplished via various forms of data compression. Audio data compression is not ideal for a number of reasons. In many compressed audio formats, latency occurs when the compressed audio is decompressed in real-time. This is unacceptable for triggering the audio in a real time performance using a MIDI keyboard or similar device for controlling the performance. Although compressed audio is more suitable for downloading audio over an Internet connection, the compressed format must still be saved locally in a decompressed format on the computer for real-time performance. Footprint conservation, therefore, is not actually accomplished with this method. Compressed audio formats are further limited by the degree of footprint reduction they provide relative to audio quality degradation. Regardless of the audio compression method used, it is not completely lossless in sonic quality once decompressed.

A solution is needed that enable building a sample library that can be used to create realistic sound mimicking real instruments, but which has a reduced footprint. The solution should also enable rapid recreation of the sounds, so that it can be used in live performance and not require heavy computational operations.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments disclosed herein solves all three audio data compression related issues mentioned in the Background section. Specifically, disclosed embodiments provide a sample library having small footprint, while still preserving a realistic sound of real musical instruments played at various dynamic levels. Thus, these embodiments require small amount of storage space. Since the embodiments have small footprint, no compression algorithm is required, thus preventing the issue of latency during live performance. Also, the convolution algorithm can process the audio samples in realtime.

Various disclosed embodiments use a unique process of reducing the footprint of a conventional mapped sample library. The embodiments eliminate the majority of the mapped audio samples that would normally be several seconds in length and replaces each of them with a sound signature, referred to herein as Impulse Response (IR), that is only a fraction of a second in length. Each unique impulse response remains mapped to the same pitch and velocity that its original full-length sample was mapped to. When the music playback device receives a control message that would normally trigger the conventional sample, the Mapped IR is used to change the timbre and amplitude of a different conventional sample (referred to as the signal) to match the timbre and amplitude of the sample the Mapped IR was generated from. The IR is typically a very short sample (e.g., 1024 samples). Thus, the vast majority of original signal samples are no longer required; thereby the global library footprint is significantly reduced. The length of the IR signal should be selected so as to include sufficient spectral information, thus enhancing the sound quality. The selection of length has to be long enough to include enough information to realistically recreate the timbre of the target. Also, a limitation on length is the amount of time it takes to perform the FFTs and iFFTs. Specifically, every doubling in the length of the IR requires more than twice as many processor cycles to calculate the FFT. So, for example, if for an IR of 512 samples, we require 1397 processor cycles, for an IR of 1024 samples we require 3082 processor cycles, and for an IR of 2048 we require 6781 processor cycles to perform one FFT. In the disclosed examples, to produce the convolution in realtime, we require one FFT and one iFFT per channel for every frame size samples in the signal, which can add up quickly. So this should be taken into account when deciding on the length of the IR.

Mapped Impulse Responses can be used to clone similar sounds. Examples of sounds that can be cloned with Mapped Impulse Response include, but are not limited to: organ stops, brass instrument mutes, or guitar pickups.

Since disclosed embodiments replace the majority of the conventional dynamic layer samples with Mapped Impulse Responses, it is possible to use a higher number of dynamic layers. This not only further reduces footprint but also conserves computer CPU usage significantly while blending between dynamic layers during real-time performances, thus providing a more authentic sound.

According to disclosed aspects, a music sample library is provided, comprising a plurality of main sample recordings, each main sample recording corresponding to a respective note; and a plurality of impulse response (IR) signals, each IR signal being mapped to selected main note of the plurality of main sample recordings and comprising a deconvolution of a sample recording of the selected main note and a sample recording of a target note, the target note reflecting a different dynamic layer of the main note. Each of the plurality of main samples comprises a sample recording of a note, the sample recording having highest frequency information of a plurality of sample recordings of the note, each of the plurality of sample recordings of the note having a different dynamic level. The music sample library may further comprise a plurality of attack recordings, each attack recording being mapped onto one of the IR samples. Each of the plurality of attack recording may comprise an IR signal of an attack.

Calculating each IR signal may comprise:
performing FFTs on successive segments of the main signal at selected intervals to thereby obtain a frequency domain representation of each segment of the main signal;
performing FFTs on successive segments of the target signal at selected intervals to thereby obtain a frequency domain representation of each segment of the target signal;
averaging all of the frequency domain representations of the segments of the main signal to thereby create a spectral average of the main signal;
averaging all of the frequency domain representations of the segments of the target signal to thereby create a spectral average of the target signal;
applying inverse FFT to the spectral average of the main signal to thereby obtain a time domain representation of the spectral average of the main signal;
applying inverse FFT to the spectral average of the target signal to thereby obtain a time domain representation of the spectral average of the target signal;
applying a windowing function to the time domain representations of the spectral averages of the main signal;
applying a windowing function to the time domain representations of the spectral averages of the target signal;
applying FFT to the windowed time domain representations of the spectral averages of the main signal, to obtain frequency domain data of the main signal;
applying FFT to the windowed time domain representations of the spectral averages of the target signal, to obtain frequency domain data of the target signal;
deconvolving the frequency domain data of the main signal and the frequency domain data of the target signal, to thereby obtain frequency domain representation of the IR;
applying an inverse FFT to the frequency domain representation of the IR, to thereby produce a time domain representation of the IR;
storing time domain representation of the IR in correspondence to the main signal.

According to further aspects, a method for constructing and operating a music sample library is provided, comprising: obtaining a plurality of samples; dividing the plurality of samples into a plurality of sub-samples, each sub-sample comprising a plurality of recorded samples corresponding to a single note of a single musical instrument, wherein each of the plurality of recorded samples comprises a dynamic level of the single note; for each of the sub-samples performing the steps: determining the recorded sample having highest level of frequency information within the sub-sample and designating that sample as the main sample, and designating the remaining recorded samples as target samples; calculating a plurality of impulse response (IR) signals by deconvolving each of the target samples with the main sample; and storing the main sample and the IR signals.

Calculating a plurality of IR signals may comprise calculating spectral average of each main sample and target sample. Calculating a plurality of IR signals may further comprise applying fast Fourier transform to each of the spectral average of each main sample and target sample. The method may further comprise storing each of the spectral average of each main sample and target sample in a time domain, and windowing each of the spectral average of each main sample and target sample prior to performing the fast Fourier transform. The step of windowing may include setting to zero start and end of each of the stored time-domain of the spectral average of each main sample and target sample. The step of windowing may comprise applying Hamming windowing. Storing the IR signals may comprise storing each IR signal in time domain. Calculating a plurality of impulse response may be performed in a frequency domain, and wherein each IR signal is transformed into the time domain prior to performing the storing step. The method may further comprise storing an initial segment of each of the target samples, wherein the initial segment corresponds to an attack portion of the target sample.

Calculating the spectral averages may comprise performing FFTs on successive segments of the signal and target at selected intervals (segments could be separated by some difference for more approximate average or overlapping for a more accurate average), resulting in a frequency domain representation of each segment of the signal and target. All the frequency domain segments of the signal are then averaged together to create a spectral average of the signal (which is still in the frequency domain) and the same thing is done for the target. To perform the deconvolution, we need this data in the time domain, so we have to apply iFFTs (inverse FFTs) to both the spectral average of the signal and target. Now we have a time domain representation of the spectral average of the signal and the target. A windowing function must be applied to the time domain representations of the spectral averages, which gradually reduces the values of the samples to zero as one moves from the middle sample towards the first and last samples of the time domain representations of the spectral averages. The windowed data is arranged in new buffers that are twice the length of the original buffer, and the signal and target are arranged differently. FFTs are then applied to the windowed, arranged data to get frequency domain representations of this data. The deconvolution is performed, resulting in IR in frequency domain representation. An iFFT must be applied to produce the time domain representation of the IRs. Since we have twice as many samples as we need, we throw out the first quarter and last quarter of the IR, and then store the remaining samples. This is our IR, and it is in the time domain and stored this way.

The method may further include, whenever receiving a command to play a target sample, performing further steps comprising: fetching a corresponding main sample; fetching a corresponding IR signal; convoluting the corresponding main sample and the corresponding IR signal to thereby generate a simulated target sample; outputting the simulated target sample.

The method may further include, whenever receiving a command to play a target sample, performing further steps comprising: fetching a corresponding main sample; fetching a corresponding initial segment of the target sample; fetching a corresponding IR signal; convoluting the corresponding main sample and the corresponding IR signal to thereby generate a simulated target sample; outputting the initial segment of the target sample first and then outputting the simulated target sample. The method may further comprise crossfading the initial segment and the simulated target sample.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 2A and 2B are illustrations of the difference between the arrangement of a standard mapped sample set and a Mapped IR sample set, according to disclosed embodiments.

FIGS. 3A and 3B are illustrations of a principle organ pipe sample set and how it can be converted to a reed stop using Mapped IR technology, according to disclosed embodiments.

FIGS. 4A and 4B are a block diagram of a process that could be used for the deconvolution process according to disclosed embodiments.

FIG. 5 is a block diagram of a process of converting an existing mapped sample library to a Mapped IR library, according to disclosed embodiments.

DETAILED DESCRIPTION

Figure 1:
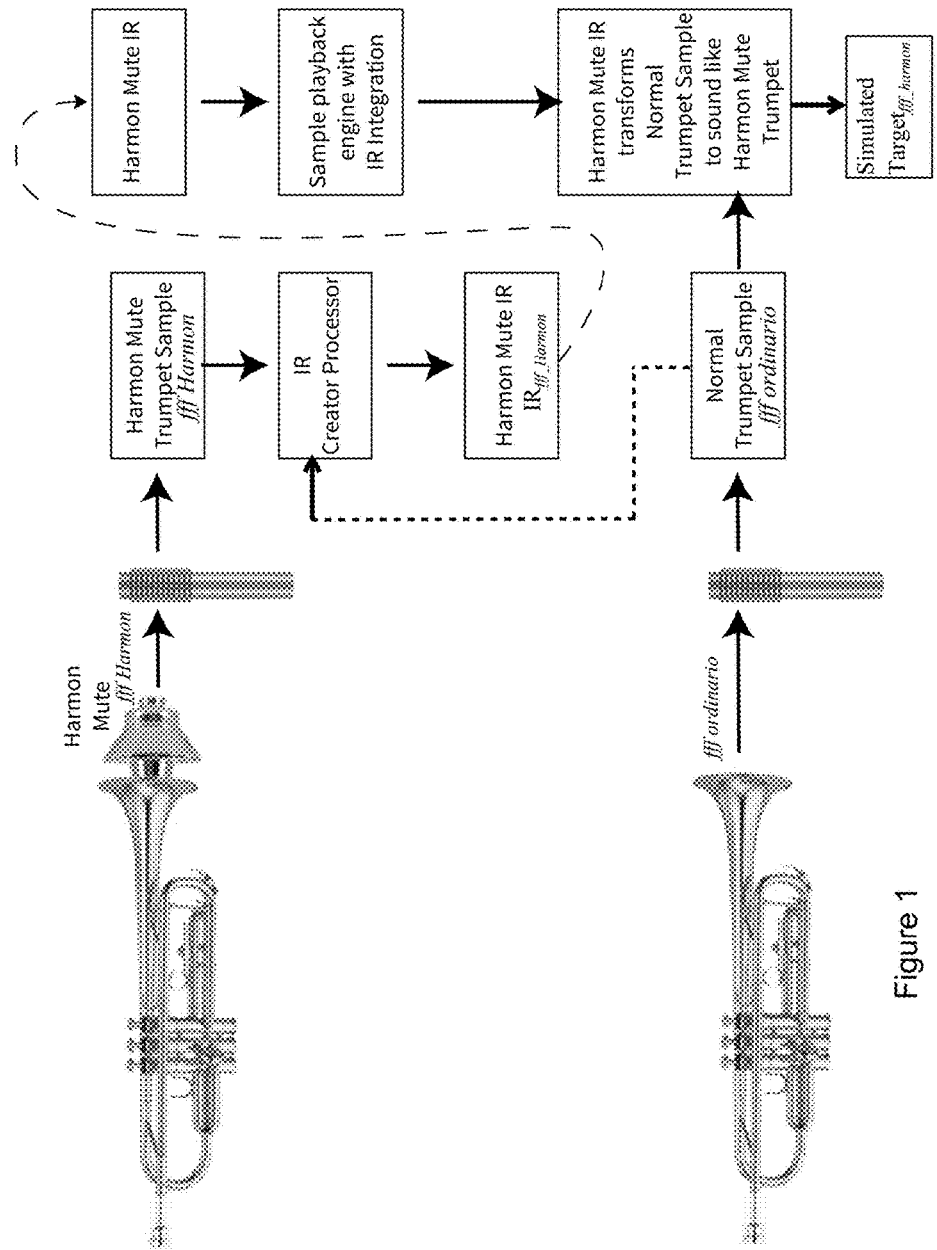
FIG. 1 is a diagram of an example of using Mapped IR process for cloning a Harmon mute trumpet, using the standard trumpet samples as a signal, according to disclosed embodiments.

Embodiments of the inventive mapped impulse responses sample library will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

In the context of this disclosure, the following definitions apply:

Convolution in general terms is an operation on two (first and second) functions that generates a third function, which is a modified version of the original function. In this context, convolution is a process whereby the spectral content of an audio signal (first function) is filtered by the spectral content of an impulse response (IR—second function) to produce an output signal (third function that is a modified first function). Throughout this document, the convolution process will be referred to with a '*', whereas an '×' will denote a normal multiplication.

Deconvolution is a process by which two samples (the signal and the target) are used to produce an impulse response (IR), which can be used in a convolution process to turn the signal into a simulated target. Throughout this document, the deconvolution process will be referred to with a '/'.

The term signal refers to the input audio signal, while the term output refers to the output audio signal.

IR refers to the impulse response, which is used for filtering the Signal to generate the simulated target.

The term target refers to an actual audio sample the system aims to simulate, while simulated target refers to the output signal that results from the convolution of the signal and the IR so as to simulate the target.

FFT refers to Fast Fourier Transform and iFFT refers to inverse Fast Fourier Transform Dynamic level refers to any of the musical terms for an instrument's specific volume and its associated timbre (e.g. fortissimo, pianissimo, etc.). Dynamic layer refers to any recording of a specific audio sample of an instrument at a specific volume and timbre at a specific dynamic and with a specific playing style.

In order to provide a complete solution, disclosed embodiments enable both generating a sample library with reduced footprint and enable rapid recreation of the sounds from the library to enable live performance without latency. The disclosure of the embodiments starts with the creation of the sample library.

In the following description, an embodiments is disclosed which enables to drastically reduce the footprint of an audio sample library by eliminating the bulk of the samples and simulating them with convolution. In one embodiment, one representative audio signal is selected from the samples of a specific instrument, and then the remaining samples of that instrument are deconvolved with the selected audio sample to generate a plurality of IRs for each of the other samples. The other samples can then be discarded and replaced by their corresponding IR sample. For example, by deconvolving an fff horn sample and a ppp horn sample, the ppp sample can be replaced with an impulse response containing information about the ppp sample.

The IR produced by the deconvolution process contains information needed to turn the spectrum of the fff sample into the ppp sample. For example, let's say the ppp sample has an amplitude of 0.5 for a given frequency. Then the simulated target should also have an amplitude of 0.5 for that frequency. If the corresponding IR just contained information about the spectrum of the ppp sample, then the IR would also have a value of 0.5 for that frequency. But if the signal also already has a value of 0.5 for that frequency, the result of the convolution would produce a value of 0.25 (0.5×0.5), which would not be correct. Therefore, in generating the IR the deconvolution process takes information from both the signal and the target to produce an IR with the correct values to turn the signal into the target, so if the target has a value of 0.5 and the signal has a value of 0.5 for a given frequency, the IR would have to have a value of 1.0 for that frequency.

During replay this impulse response can be applied to the fff sample to simulate a convincing ppp sample. It should be noted that convolution is a subtractive process, so the signal sample must have the most spectral content for the process to work correctly (e.g. it is not possible to simulate an fff sample from a ppp sample.) In this example, the original ppp sample is the target, and the output signal resulting from convoluting the ppp IR and the fff sample is the simulated target.

Thus, this embodiment can be summarized as a process of generating a sample library by: obtaining a plurality of samples of sounds, selecting one of the samples which has the most spectral content and designating the one sample as the input sound, generating an impulse response signal for each of the remaining samples by deconvoluting each of the other signals with the input sound, storing the sample library by storing the input sound and each of the impulse response signals. The plurality of samples of sounds may be sample sounds of a selected note played by a selected instrument and multiple different dynamic layers.

The following example describes the amount of footprint reduction possible using the Middle-C samples for a sampled trumpet. For this example there are five separately recorded audio samples representing the dynamic layers fff, f, mf, p, and ppp. Additionally, the same 5 dynamic layers are recorded playing the trumpet with straight mute, cup mute, Harmon mute, and bucket mute. Each sample is a 5-second-long stereo recording, recorded at 48K/24 bit. Each audio file is 2 channels×5 seconds×48000 samples/second×3 bytes/sample=1,440,000 bytes. Multiply this by five dynamic layers and five playing styles, and the result is a total of 36,000,000 bytes of audio data to simulate a trumpet using conventional sampler methods playing only a single pitch.

Most of the dynamic layers in the example can be eliminated by simulating them with convolution. The fff ordinario sample is chosen for the signal because it contains the most spectral information. IRs are extracted from the remaining dynamic layers (f, mf, p, and ppp), by deconvoluting each dynamic layer sample with the fff ordinario sample. For example, the $IR_{p\_ord}$ for the p ordinario is obtained by the deconvolution:

$$Signal_{fff\_ord}/Sample_{p\_ord}=IR_{p\_ord}$$

Each of the IRs is stored and then the samples for the corresponding dynamic layers can be discarded.

To reproduce, for example, the p ordinario sample, the following convolution is performed:

$$Signal_{fff\_ord}*IR_{p\_ord}=\text{Simulated Target}_{p\_ord}$$

Each recorded dynamic layer of the trumpet using the various mutes are also replaced with an IR containing information about the frequency response of the given mute at that dynamic. As illustrated in FIG. 1, using this method, a Harman muted trumpet is recorded with a microphone to generate a Harmon muted trumpet sample fff harmon. The trumpet is also recorded without a mute to generate the fff ordinario sample. The IR for the fff harmon sample is obtained by deconvoluting the fff harmon sample with the fff ordinario sample in the IR creator processor using the function:

$$Signal_{fff\_ord}/Sample_{fff\_Harmon}=IR_{fff\_Harmon}$$

Once this new sample library is constructed, every sample in the set of middle-C trumpet samples can be simulated using one original, five-second audio sample and 24 IRs. Each IR is 1024 stereo samples in a 32-bit float sample format: 2 channels×1024 samples×4 bytes/sample=8192 bytes. The new size of the sample set is one 1,440,000 byte audio sample plus 24×8192 IRs (196,608 bytes)=1,636,608 bytes. For this example, the footprint is reduced by 96%.

Then, as illustrated in FIG. 1, when a signal is received to generate the fff harmon sound, e.g., by a MIDI, it is simulated by the sample playback engine having the IR integration in the following way:

$$Signal_{fff\_ord}*IR_{fff\_harmon}=\text{Simulated Target}_{fff\_harmon}$$

FIGS. 2A and 2B illustrate example for the arrangement of a standard mapped sample set and a Mapped IR sample set, respectively, for a keyboard, e.g., a piano. FIG. 2A illustrates three samples, ff, mp, and pp, for each key indicated by arrow (although in reality all keys would be sampled). Conversely, FIG. 2B illustrates the library constructed according to the disclosed embodiments, wherein for each key, the loudest sample is stored, together with corresponding IR of the quiet and quietest samples. Thus, when a key is to be sound, e.g., quiet sample E3, the IR of the quiet E3 and the sample of the loudest E3 are convoluted to recreate the sound of a sampled quiet E3.

FIGS. 3A and 3B illustrate an embodiment wherein the samples of one instrument can be modified to generate the sound of a different instrument or different character. FIG. 3A illustrates a sample library of the principle sounds of the organ keys recorded using the flue pipes, e.g., the $Signal_{ff\_ord}$ for each note. FIG. 3B illustrates an IR library of the corresponding IR generated for each of the notes, but which store the sound characteristic of Reed Pipes. A reed pipe is sounded by a vibrating brass strip known as a reed, as opposed to flue pipes, which produce sound solely through the vibration of air molecules. Thus, the sound character of a reed pipe is different from that of a flue pipe. However, rather than storing the fff ordinario sound for each note of the reed pipes, this embodiment makes use of the fff ordinario sound of the corresponding flue pipe. Then, for each note of the reed pipe, the corresponding fff ordinario sound of the flue pipe is convoluted with the IR of the reed pipe, to generate a target sample of a reed pipe. In this sense, this embodiment employs a convolution of a sample of a first instrument and an IR of a second instrument to generate the sound of the second instrument, thus not requiring storing samples of the second instrument.

Figure 4A:
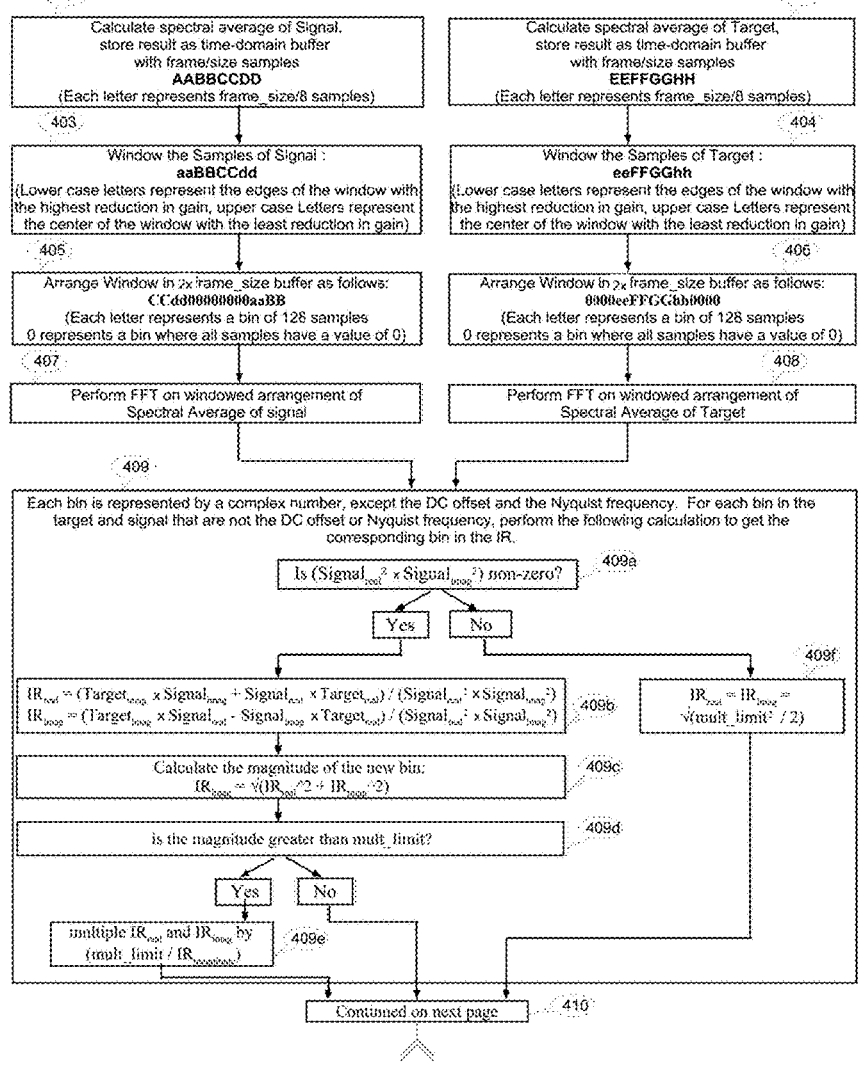

As noted above, Deconvolution is a process by which two samples (the signal and the target) are used to produce an impulse response (IR) signal, which can be used in a convolution process to turn the signal into a simulated target. FIGS. 4A and 4B illustrate example of a flow chart for performing the mapped IR deconvolution according to disclosed embodiments. In this example the samples are first inspected and the sample having the most spectral information is selected as the Signal. The IR generated is for the sample identified as Target, which is the sample sought to be mimicked during performance. The process of deconvolving the Signal and the Target proceeds as follows, noting that the steps are not necessarily performed in the order indicated and that some steps may be performed in parallel.

Normally, the Signal and the Target samples are of length of about five seconds. However, as noted, one objective is to reduce the storage size required. Therefore, the size of the IR sample is reduced to, say 1024, 2048, etc. Step 401 and 402 are performed in order to reduce the size of the Sample and Target to the specified size of the IR, e.g., 1024. In Step 401 the spectral average of the signal is calculated and the result is stored in a 'frame size' buffer where 'frame size' refers to the number of samples we wish the IR to have at the end of the deconvolution process, which must be a power of 2 and will typically be at least 1024 samples. The IR size, e.g., 1024 samples, should be much smaller than the size of the original Signal or Target, and is graphically indicated as AABBCCDD (where each letter represents frame_size/8 samples). The averaging generally calculates the amount of energy present for each frequency on average over the length of the Signal, and same for the Target. At step 402 the same process is performed on the Target to reduce the size of the Target.

An audio sample is normally in the time domain, where each sample represents the sound pressure level at a given time, exactly what time is determined by that sample's position in the overall audio sample and the sample rate. Mathematically, any periodic signal can be represented by the addition of a set of sine tones. We perform an FFT on our time domain data (the normal audio sample, or in this case a small chunk of it), and when we do this, we are assuming that this section is one period of a periodic signal. The result of the the FFT is a new representation of the exact same data in the frequency domain, a set of bins, each bin containing the amplitude and phase of one of our sine tones which can be added together produce the original signal. Note that this is a lossless operation: the FFT simply produces a new representation of the exact same information. The spectral averaging has to be performed in the frequency domain, and at the end turned back into time domain data using an iFFT so that it can be put in the form necessary for performing the deconvolution.

An FFT assumes that the data it is performed on is periodic. However, because we perform the FFT on data that is not periodic (i.e., we take a chunk of samples out of a continuous signal, and that chunk does not repeat over and over again for the duration of the audio sample) a discontinuity between the first and last sample (i.e., a very large difference in value between the last and first sample, where the chunk would repeat if it were a periodic signal) will be interpreted by the FFT as the presence of a tremendous amount of energy at the top of the spectrum, i.e., very loud high harmonics. These harmonics are in reality not present in our sound because it is not actually a periodic signal, so a windowing process is used to filter out these imaginary high harmonics.

In 403 a windowing process is applied to the samples of the Signal, and in 404 the windows are applied to the samples of the Target. The windowing process applies attenuation to the start and end of the buffer. This helps avoiding discontinuities across the data in the buffers. In this example the windowing process is applies such that the buffer begins and ends at zero. Windowing can be applied using, e.g., a triangular function, starting from zero, increasing gradually until reaching the center of the buffer, and then reducing gradually until reaching the end of the buffer. Alternatively, a "bell shape" (e.g., Hann, Hamming, Blackman or Nuttall window), or any other function can be used for the windowing, but preferably the start and end of the buffer are set to zero. In this particular example a Hamming Window is used.

In 405 the windowed spectral average of the Signal is rearranged in a new buffer twice the size of the original buffer, whose extra samples are set to 0, and in 406 the same is done for the Target, although the arrangement of samples is different from the arrangement of the spectral average of the signal. In 407 FFT is performed on the windowed arrangement of the spectral average of the Signal, and in 408 the FFT is applied to the windowed spectral average of the Target. Once the FFT is performed, each bin is represented by a complex number, except the DC offset and the Nyquist frequency.

Depending on the FFT implementation (i.e., which FFT library is used to perform the FFT) the resulting arrangement of the information in RAM may be different, but the result is a set of bins, each bin representing the amplitude and phase of a sine tone at a one frequency (for the DC offset and Nyquist only amplitude is given), and this information can be represented in polar or complex coordinates (either as an amplitude-phase pair or real-imaginary pair), and these forms are just different representations of the same information. It is well-known how to change between polar or complex coordinates representations. In this example we perform the deconvolution on the complex representation of data, but we could just as well perform it on the polar version of the data, using modified equations.

Box 409 illustrates the steps for obtaining the corresponding bins for the IR, for each bin in the Target and the Signal that are not the DC offset or Nyquist frequency. Box 411 illustrates the steps for the DC offset and box 412 illustrates the steps for the Nyquist frequency (which do not have phase, only amplitude and thus are not represented by a complex number).

The following steps are performed in 409 to get the corresponding bins in the IR (each bin representing phase and amplitude at a given frequency). In 409a it is checked whether the Signal's real part squared times the imaginary part squared is zero. If it is, the real and imaginary parts of the IR for that bin is set to the square root of half the limit squared. That is, in FIG. 4A, the term "mult_limit" refers to the maximum amplitude allowed, i.e., an allowed maximum amplitude is pre-programmed and the value is used whenever the flow chart indicates "mult_limit".

When the Signal's real part squared time the imaginary part squared is non-zero, the process proceeds to 409b, wherein the real and imaginary parts of the IR are calculated using the real and imaginary parts of the Signal and Target, which generally forms the deconvolution process. The result is used in step 409c to calculate the magnitude (i.e., amplitude) of the bin. In step 409d it is checked whether the magnitude is greater than the allowed limit mult_limit. If no, the process proceeds to 410 which is shown in FIG. 4B. If the magnitude is above the limit, the real and imaginary parts of the IR are scaled using the scaling factor (mult_limit divided by IR magnitude).

In 411 the DC offset for the IR is calculated. In 411a it is checked whether the DC of the signal is non-zero. If it is non-zero, at 411b the $DC_{IR}$ is set as the ratio of the $DC_{Target}/DC_{Signal}$. On the other hand, if the $DC_{signal}$ is zero, in 411c it is checked whether $DC_{Target}$ is positive. If it is, at 411d $DC_{IR}$ is set to positive value of the amplitude limit mult_limit. If $DC_{Target}$ is negative, then $DC_{IR}$ is set to the negative value of the amplitude limit.

In 412 the Nyquist for the IR is calculated. In 412a it is checked whether the Nyquist of the signal is non-zero. If it is non-zero, at 412b the $NQ_{IR}$ is set as the ratio of the $NQ_{Target}/NQ_{Signal}$. On the other hand, if the $NQ_{Signal}$ is zero, in 412c it is checked whether $NQ_{Target}$ is positive. If it is, at 412d $NQ_{IR}$ is set to positive value of the amplitude limit mult_limit. If $NQ_{Target}$ is negative, then $NQ_{IR}$ is set to the negative value of the amplitude limit.

In step 413 the IR signal calculated is converted from the frequency domain to the time domain by performing an inverse FFT on the calculated time domain IR data. Then at 414 the time domain IR data is stored at the set IR sample size, e.g., 1024, 2048, etc.

The deconvolution process of the disclosed embodiments can be used to build a sample library for use during performance or recording. Of course, the deconvolution process can also be used to convert an existing sample library to an impulse response library according to the disclosed embodiments. FIG. 5 is a block diagram of a process of converting an existing mapped sample library to a Mapped IR library, according to disclosed embodiments.

In step 501 all the samples mapped in 502 are scanned and in 502 all the samples with the highest velocity range (i.e., having the most dynamic information) are selected. In this example the ff (fortissimo) samples are selected for each note and for each instrument. Each of these samples, ff1, ff2, ffn, will be designated as the Signal when performing the deconvolution (and thereafter when performing the convolution for playback). The arrangement is graphically illustrates in 504, wherein the top row represents storage of each fortissimo sample for each note and/or instrument. For each of the fortissimo notes a series of corresponding IR samples will be calculated and stored in a mapped fashion, as follows.

In 505 a first Target sample is selected, say a Target sample corresponding to Signal ff1. Sometimes the Target will have the exact same pitch as the Signal, but that is not always the case. Therefore, in 505 an allowance is made up to half tone higher or lower than the Signal. Then in 506 if the pitch does not match exactly, the playback speed of the Target is slowed down or speed up so that it matches the pitch of the corresponding Signal. Once the pitch of the Target matches that of the Signal, in 508 the deconvolution process is performed using, e.g., the process described in FIG. 4A and 4B, to generate the IR sample, which is stored in a mapped fashion, as shown in 509. This process is repeated until in 510 all of the original samples, other than the selected samples corresponding to the Signal, are replaced by corresponding mapped IR samples.

According to a further embodiment, the simulation is further improved to provide a more "authentic" sound. In this embodiment the same process of generating IRs as before is performed; however, this embodiment involves improving the simulation of attacks. Attack contributes to the timbre of the sound and reproducing the proper attack will produce a more realistic simulated target. Attack may be defined as the initial phase of a played note, when the note's volume is rising from silence to (typically) its maximum level.

For example, if a ppp sample is simulated from a fff brass sample, the cuivre attack of the loud (fff) sample will still be present (albeit in a slightly filtered form) in the simulated target. The following embodiments utilize various mechanisms to more realistically simulate the Target.

According to a first embodiment, the mapped IR library is built using any of the disclosed embodiments. However, during playback the sounding of the simulated target starts after a preset period, e.g., 500 milliseconds, from the start of the Signal. That is, rather than convoluting the IR with the entire length of the Signal, a set length at the start of the Signal, say 500 ms, is discarded and the convolution starts after the discarded Signal. In this manner, the attack part of the Signal is discarded.

According to another embodiment, in addition to discarding the attack part of the Signal, an original sample of the attack of the Target is played back and thereafter the playback is faded into the simulated Target. Thus, for example, in the case of a ppp sample simulated from a fff brass sample, the attack from the original ppp sample is first played back, and then a crossfading is performed into the simulated ppp sample using the IR and the undiscarded part of the fff brass sample. This makes the footprint slightly higher, but provides an improved sound for the simulated Target.

As an example, if an average original sample is a 5 second stereo sample, the sample rate is 48K, and the sample format is 32-bit float (4 bytes), then the size would be: 2 channels*5 seconds*48000 samples/second*4 bytes/sample=1,920,000 bytes. So, without convolution, for a note with five dynamic layers, we would need 9,600,000 bytes. Assuming a 500 ms attack sample, storing the attack requires the following amount of storage: 0.5 seconds*2 channels*48000 samples/second*4 bytes/sample=192,000 bytes. A 1024 sample IR=1024 samples*4 bytes/sample*2 channels=8,192 bytes. So with convolution, five dynamic layers would require one Signal (1,920,000 bytes) plus 5 attack samples (5*192,000=960,000 bytes) plus 5 Irs (5*8,192=40,960 bytes)=2,920,960 bytes. Therefore, with convolution we require only 30% the amount of storage as we do without convolution.

Thus, according to disclosed embodiments a digital library of music sampling is provided, the digital library structured to store data for recreating sounds of different pitches of different musical instruments, wherein for each pitch of each musical instrument the digital library comprises a main sample recoding corresponding to highest dynamic layer and a plurality of impulse response signals, each impulse response signal comprising a deconvolution of the main sample recording and one target sample of lower dynamic layer (or differing playing style) than the main sample recording. The digital library may also include attack recording for each of the target samples. Each of the IR samples is stored in the time domain.

The digital library being programmed to, wherever receiving a command to output one of the target samples, convoluting the main sample with the corresponding impulse response to thereby generate a simulated target sample, and output the simulated target sample. The digital library may also be programmed to, whenever receiving a command to output one of the target samples, to first output a segment corresponding to attack portion of the target sample, and thereafter output a simulated target sample, wherein the simulated target sample comprises a convolution of the main sample with the corresponding impulse response.

Another effective use of IRs can be for crescendo and decrescendo. The musical terms crescendo and descrescendo refer to sustained dynamic swells that increase or decrease in volume/energy. An additional advantage of simulating samples using the above IR method is the ability to perform a seamless crescendo or descrescendo from the quietest sample to the loudest sample by cross-fading the IRs we use to perform the convolution. When using conventional samples, this method is usually very difficult to achieve since all samples involved in the swell must remain perfectly in tune and in phase to avoid sonic artifacts. Since simulating crescendi and decrescendi with convolution involves the playback of a single sample, which is filtered in different ways to produce the changing dynamics, issues of phasing and tuning are eliminated.

According to one embodiment, each IR is mapped onto a MIDI velocity and volume controller value between 1 and 126. The implementation is of course, not limited to use with only MIDI and can also be used in any other protocol used for sample library management. Velocity/controller value 0 is reserved for the Null IR (all zeros) and 127 is reserved for the Identity IR (a 1 followed by frame_size−1 0 s). The product of any signal convolved with the null IR is silence, and the product of any signal convolved with the unity IR is the input signal. This gives a continuous dynamic/timbral range from silence to the original signal. To perform crescendo or decrescendo the signal is convolved with the various IR's and the output is faded between one to the other in turn over time.

The following is an example for a trumpet, wherein the signal is for the ordinario fff.

TABLE 1

| Volume Controller Value | IR |
|---|---|
| 0 | Null IR |
| 10 | $IR_{trumpets\_ordinario\_ppp}$ |
| 30 | $IR_{trumpets\_ordinario\_p}$ |
| 60 | $IR_{trumpets\_ordinario\_mf}$ |
| 100 | $IR_{trumpets\_ordinario\_f}$ |
| 127 | Identity IR |

In an example wherein a volume controller value is received that falls between one of these IRs, then the system may interpolate between the IRs. This interpolation may be done on the bins in the frequency domain to produce a new frequency domain IR that is used for convolution. For example, if a value of 15 is received, then $IR_{trumpets\_ordinario\_ppp}$ is scaled by 0.75 and $IR_{trumpets\_ordinario\_p}$ is scaled by 0.25, and the resulting values are then added together. Scaling an IR involves multiplying both the real part and imaginary part of each bin by the scaling factor. (Note: This example uses linear interpolation, however other forms of interpolation are possible.)

Every time a different IR is used with the same signal, there is the potential for audible artifacts due to the sudden change in volume and timbre. This is especially problematic during a crescendo or decrescendo when the IR may change every frame, e.g., the first 1024 samples at ppp, the next 1024 samples at pp, the next 1024 samples at p, and so on. The result is an audible zippering effect caused by slight discontinuities between frames. To avoid this problem, every time an IR changes, two convolutions are performed with the same block of input samples: one using the IR active on the previous frame and one using the new IR. The output is a single frame that is a crossfade from the first convolution to the second convolution.

The above description of the embodiments provide examples of using the IR technology for sampled musical instruments. The stored IR's in these embodiments can be used to recreate the sounds of the original instrument, to change the characteristics, e.g., timbre of one sound to another, to apply sound effects, to replace one synthesized sound with another, etc. The possibilities are enabled by applying the IR as a filter onto a main sampled sound, so as to modify the main sampled sound. However, this technology is by no means limited to musical instruments, but is applicable to other sound sampling. Also, during playback of the samples it is possible to perform stringing together of multiple IR's horizontally, as it were, affecting a single main sample over strategically placed time intervals. This can be achieved by performing the convolution multiple times with the multiple different IRs and then crossfading between them.

Figure 6:
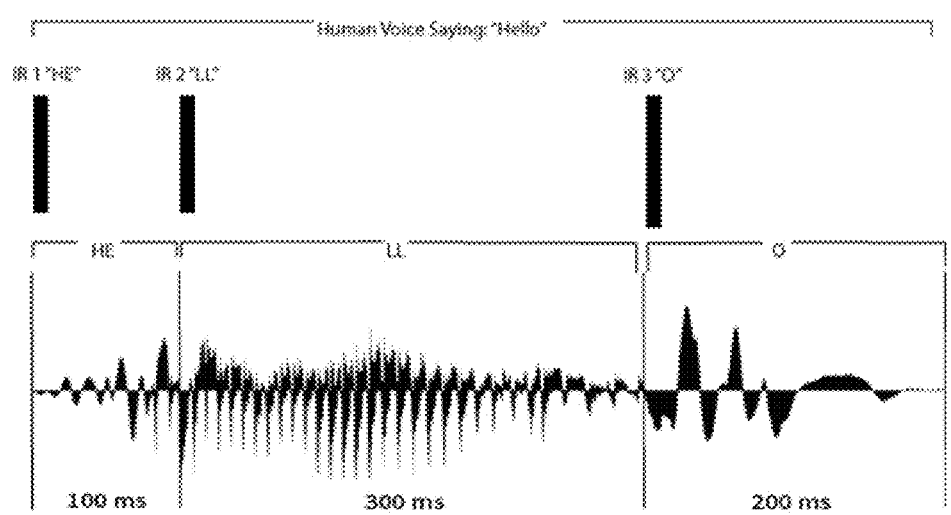
FIG. 6 illustrates an example using the human voice for producing impulse response library, according to disclosed embodiments.

FIG. 6 illustrates an example using the human voice. In this example, the human voice is sampled, and the sample recording is marked or divided to separate the consonant and vowel sounds into discrete time segments. These discrete human voice samples of different people may then be converted into IR's. These IR's can then be strung one after the other over time to change the voice characteristics of one person's voice into another.

The following are some examples of the use of voice-based IRs. In one example, various applications of text-to-voice are well known. Often used applications include GPS navigation, Siri®, Alexa®, etc. However, such applications operate using a single voice or one selected voice from a list of available voices. Conversely, by applying IR's, the application may use any voice. For example, when receiving a text, IR's of the text's sender may be included, such that when voicing the text Siri can use a voice mimicking the sender of the text. Moreover, by having the sender's IR's for consonants and vowels, the message may be translated to another language and the sender's IR's can be used to voice the translated message in the sender's voice, even if the sender does not speak the language. In fact, as one voice can be changed to another, an application such as Karaoke can be changed such that the user can be made to sound like the voice of the original singer of each song.

Thus, a method is provided for changing the characteristics of one recorded sound by applying an impulse response filtering, comprising: obtaining a main recording; obtaining an impulse response (IR) of a second recording, the second recording having different characteristics from the main recording, wherein the IR comprises a deconvolution of the main recording and the second recording; convoluting the main recording and the IR to generate a simulated second recording; outputting the simulated second recording. In a variant, a series of IR's of the second recording are convoluted with the main recording. The main recording may be of one human voice and the second recording may be of another, different human voice. The IR's may comprise a plurality of IR's, each corresponding to one consonant or vowel.

A text to voice system may be provided, comprising: a plurality of sample recording of a human voice, each of the plurality of sample recording comprising a consonant of a vowel; a plurality of impulse response (IR) signals, each IR signal corresponding to one of the consonants or vowel, and comprising a deconvolution of a human voice; the system configured to convolute selected ones of the sample recordings with corresponding IR signals t thereby output a simulated human voice.

Various embodiments were described above, wherein each embodiment is described with respect to certain features and elements. However, it should be understood that features and elements from one embodiment may be used in conjunction with other features and elements of other embodiments, and the description is intended to cover such possibilities, albeit not all permutations are described explicitly so as to avoid clutter.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A method for constructing an audio sample library stored in a digital form, comprising:
    obtaining a plurality of main samples, each main sample corresponding to a respective sound, and storing the plurality of main samples in digital form;
    generating a plurality of impulse response (IR) samples by a deconvolution of a selected main sample and a sample of a target note, the target note reflecting a different dynamic level of the selected main sample, and storing the plurality of IR samples in digital form;
    mapping each IR sample to the selected main sample of the plurality of main samples;
    wherein each of the plurality of main samples comprises a sample recording of a note having highest frequency information among a plurality of sample recordings of the note, each having a different dynamic level.

2. The method of claim 1, further comprising storing a plurality of attack recordings, each attack recording being mapped to one of the IR samples.

3. The method of claim 2, wherein each of the plurality of attack recordings comprises an IR signal of an attack.

4. The method of claim 1, wherein each of the IR samples is stored in a time domain.

5. The method of claim 1, wherein each of the IR samples is mapped onto one of volume control values.

6. The method of claim 4, wherein each of the IR samples further comprises a DC offset and a Nyquist frequency.

7. The method of claim 1, wherein each of the IR samples comprises a deconvolution of a spectral average of the selected main sample and a spectral average of the target note.

8. A method for constructing and operating a music sample library, comprising:
    obtaining a plurality of samples;
    dividing the plurality of samples into a plurality of sub-samples, each sub-sample comprising a plurality of recorded samples corresponding to a single note of a single musical instrument, wherein each of the plurality of recorded samples comprises a dynamic level of the single note;
    for each of the sub-samples performing the steps:
        determining the recorded sample having highest level of frequency information within the sub-sample and designating that sample as main sample, and designating the remaining recorded samples as target samples;
        calculating a plurality of impulse response (IR) signals by deconvoluting each of the target samples with the main sample;
        storing the main sample and the IR signals.

9. The method of claim 8, wherein calculating a plurality of IR signals further comprises calculating spectral average of each main sample and target sample.

10. The method of claim 9, wherein calculating a plurality of IR signals further comprises applying fast Fourier transform to each of the spectral average of each main sample and target sample.

11. The method of claim 10, further comprising windowing each of the spectral average of each main sample and target sample prior to performing the fast Fourier transform.

12. The method of claim 11, wherein the step of windowing includes setting to zero start and end of each of a stored time-domain of the spectral average of each main sample and target sample.

13. The method of claim 11, wherein the step of windowing comprises applying Hamming windowing.

14. The method of claim 8, wherein calculating each IR signal comprises:
    performing FFTs on successive segments of the main sample at selected intervals to thereby obtain a frequency domain representation of each segment of the main sample;
    performing FFTs on successive segments of the target sample at selected intervals to thereby obtain a frequency domain representation of each segment of the target sample;
    averaging all of the frequency domain representations of the segments of the main sample to thereby create a spectral average of the main sample;
    averaging all of the frequency domain representations of the segments of the target sample to thereby create a spectral average of the target sample;
    applying inverse FFT to the spectral average of the main sample to thereby obtain a time domain representation of the spectral average of the main sample;
    applying inverse FFT to the spectral average of the target sample to thereby obtain a time domain representation of the spectral average of the target sample;
    applying a windowing function to the time domain representations of the spectral averages of the main sample;
    applying a windowing function to the time domain representations of the spectral averages of the target sample;
    applying FFT to the windowed time domain representations of the spectral averages of the main sample, to obtain frequency domain data of the main sample;
    applying FFT to the windowed time domain representations of the spectral averages of the target sample, to obtain frequency domain data of the target sample;
    deconvolving the frequency domain data of the main sample and the frequency domain data of the target sample, to thereby obtain frequency domain representation of the IR;
    applying an inverse FFT to the frequency domain representation of the IR, to thereby produce a time domain representation of the IR signals;
    storing time domain representation of the IR signals in correspondence to the main sample.

15. The method of claim 8, wherein the step of calculating a plurality of impulse response signals is performed in a frequency domain, and wherein each IR signal is transformed into time domain prior to performing the storing step.

16. The method of claim 8, further comprising storing an initial segment of each of the target samples, wherein the initial segment corresponds to an attack portion of the target sample.

17. The method of claim 8, wherein whenever receiving a command to play a target sample, performing further steps comprising:
    fetching a corresponding main sample;
    fetching a corresponding IR signal;
    convoluting the corresponding main sample and the corresponding IR signal to thereby generate a simulated target sample;
    outputting the simulated target sample.

18. The method of claim 16, wherein whenever receiving a command to play a target sample, performing further steps comprising:
- fetching a corresponding main sample;
- fetching a corresponding initial segment;
- fetching a corresponding IR signal;
- convoluting the corresponding main sample and the corresponding IR signal to thereby generate a simulated target sample;
- outputting the initial segment first and then outputting the simulated target sample.

19. The method of claim 18, further comprising cross-fading the initial segment and the simulated target sample.

\* \* \* \* \*